United States Patent [19]

Brown et al.

[11] 4,020,701
[45] May 3, 1977

[54] GYROSCOPIC APPARATUS

[75] Inventors: Kenneth Robson Brown, Midlothian; James Holmes; Richard David Whyman, both of Edinburgh, all of Scotland

[73] Assignee: Ferranti, Limited, Hollinwood, England

[22] Filed: July 8, 1975

[21] Appl. No.: 594,117

[30] Foreign Application Priority Data

July 16, 1974 United Kingdom ............ 31372/74

[52] U.S. Cl. .................................... 74/5 R; 74/5.1
[51] Int. Cl.² ........................................ G01C 19/20
[58] Field of Search ............ 74/5 R, 5.12, 5.4, 5.1; 73/497

[56] References Cited

UNITED STATES PATENTS

| 3,453,894 | 7/1969 | Stiles et al. | 74/5 F |
| 3,478,819 | 11/1969 | Reinke | 74/5 R X |
| 3,540,294 | 11/1970 | Macon et al. | 74/5 R X |
| 3,885,443 | 5/1975 | Albert | 74/5 R |

*Primary Examiner*—Samuel Scott
*Assistant Examiner*—F. D. Shoemaker
*Attorney, Agent, or Firm*—Cameron, Kerkam, Sutton, Stowell & Stowell

[57] ABSTRACT

A floated gyroscope having a float pivoted within a housing for limited rotational movement is provided with a rotational limit control for limiting rotation when the gyroscope is not in use. The rotational limit control includes a locating pin mounted on either the float or the housing, and cooperating limit arms mounted on the other of the float and housing.

10 Claims, 5 Drawing Figures

GYROSCOPIC APPARATUS

THIS INVENTION relates to gyroscopic apparatus, and particularly, though not exclusively, to single degree of freedom gyroscopes of the floated type.

A floated gyroscope comprises a sealed container, often of generally cylindrical form, in which is located the gyro wheel. The container or "float" is itself located in a housing filled with a high-density fluid the density of which is arranged to be equal to the density of the float and its contents. Movement of the float is constrained to limited angular rotation about a single axis defined by a pair of jewel bearings. The bearings are not required to support the weight of the float as this is done by the fluid. The fluid may be highly viscous and in such a case provides a high degree of damping of the float rotation.

The density and viscosity of the fluid vary with temperature, and a heating element may therefore be used to maintain the fluid at a constant operating temperature. However, when the gyro is switched off and the temperature falls the float may rotate away from a null position. Floated gyros usually operate with very small rotations from a datum position, any movement being counteracted by means of torque input signals; even in these cases the float may rotate to the maximum allowed extent from the datum position on application of a rotation about the input axis. This results in an increased warm-up time when the gyro is switched on again, as the float has to be returned to its datum position, and this may be difficult until the fluid has reached its operating temperature, owing to the increased viscosity of the fluit when cold.

It is an object of the invention to provide a floated gyroscope which does not suffer from the above-mentioned disadvantage.

According to the present invention there is provided a floated gyroscope which includes a locating member and co-operating limit means mounted respectively one on the float and one on the housing of the gyroscope, the limit means being operable to restrict the angular movement of the locating member to less than its normal operational value when the gyroscope is not in use.

An embodiment of the invention will now be described with reference to the accompanying drawings, in which.

Figure 1:
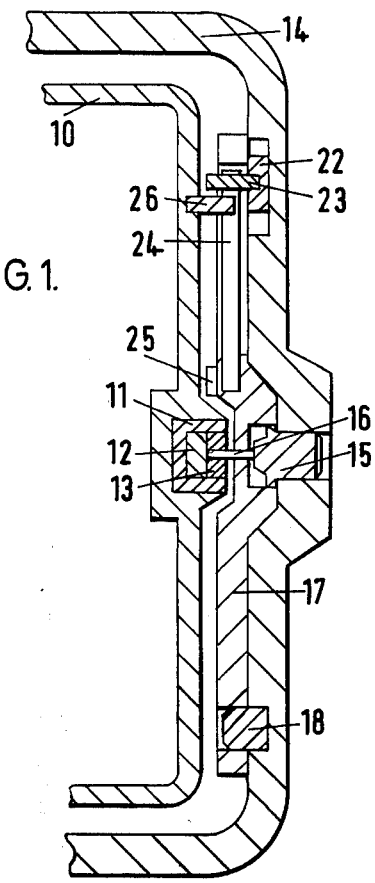
FIG. 1 is a sectional side view of part of a floated gyroscope.

Referring now to FIG. 1, this shows, in somewhat simplified form, the construction of one end of a floated gyro. The gyro float 10 contains the gyro motor and wheel (not shown) and is, in this example, of generally cylindrical shape. In the centre of the end face of the float 10 is a bearing housing 11 containing an end jewel 12 and a bearing ring jewel 13. The float 10 is itself contained within a housing 14, and the space between float 10 and housing 14 (in practice very small) is filled with a viscous fluid. In the end of the housing 14 is a boss 15 having a bearing pin 16 which co-operates with the bearing on the float 10.

Figure 2:
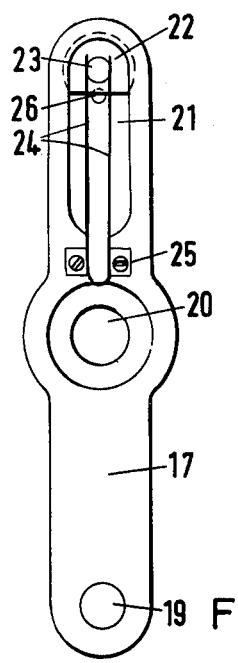
FIG. 2 is an end view of part of FIG. 1 showing the limit means in one condition.

Fitted around the boss 15 is the limit means, formed around support member 17 which is shown in more detail in FIG. 2.

The support member 17 is accurately located in position by means of a dowel pin 18 fastened to the housing 14 and engaging a hole 19 in the support member.

Referring now to FIG. 2, the support member 17 is elongated in shape and has a central hole 20 which fits around the boss 15. As already stated the location of the support member is defined by the holes 19 and 20 engaging with the boss 15 and pin 18 respectively.

One end of the support member 17 has an elongated aperture 21 formed in it across one end of which is secured a plate 22 carrying a datum pin 23. Extending along the aperture 21 is a pair of bi-metallic strips 24, one end of each of which is located in an extension of the aperture 21 and secured in position by a pair of plates 25.

As shown in FIG. 1 a pin 26, of slightly smaller diameter than pin 23 and forming the locating member, is secured to the float 10 of the gyroscope and is arranged to be located between the two bi-metallic strips 24.

Figure 3:
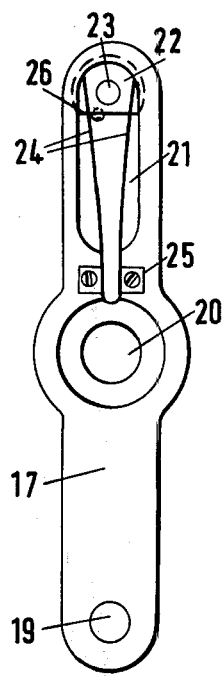
FIG. 3 shows the limit means in the other condition.

The operation of the arrangement described above will now be described with reference to FIGS. 2 and 3.

When the gyro is out of use the fluid surrounding the float 10 will be below the required operating temperature. Accordingly the two bi-metallic strips 24 will move to the position shown in FIG. 2, touching the datum pin 23. Hence movement of the float 10 is restricted to a very small extent since pin 26 attached to the float is constrained between the two strips 24. The support member 17 is located so that, in this state, the float is positioned at or very close to its null position. Angular movement of the float is not completely prevented but it need only rotate through a very small angle to reach its null position.

When the gyro is required for use the motor is run up to speed, and heaters surrounding the housing 14 are switched on. These raise the temperature of the viscous fluid to its operating value, at which it is maintained by suitable control means. Due to the increased temperature of the fluid, the two bi-metallic strips, which are surrounded by the fluid, separate as shown in FIG. 3. The pin 26 on the float 10 is thus free to move through a larger angle, as required for the normal operation of the gyro. Since the float was restrained near its null position when the fluid was cold, little re-positioning of the float is necessary before the gyro is ready for use. Particularly in the case where the fluid is highly viscous, this greatly reduces the time taken for the warm-up operation.

When the gyro is switched off the fluid cools, and hence the two strips 24 move towards one another. One or other of the strips moves the pin 26, and hence the float 10, towards the null position.

Although in the above description the support member 17 is attached to the housing 14 and pin 26 is attached to the float 10, the positions of these two may be reversed.

The bi-metallic strips described above illustrate one form of the limit means. Alternative arrangements may be used, though that described above is perhaps the simplest.

Figure 4:
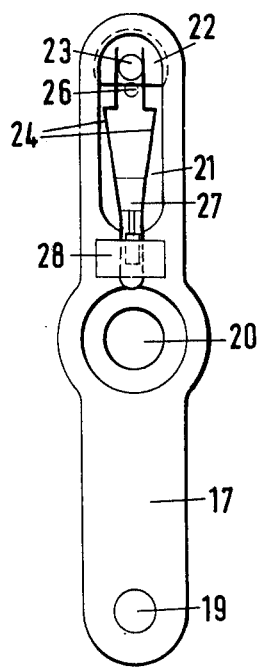
FIGS. 4 and 5 show the operation of an alternative form of limit means.
Figure 5:
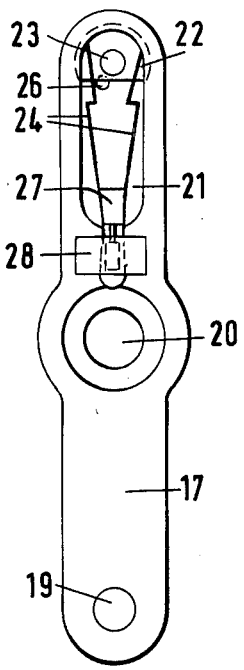

One possible alternative limit means is shown in FIGS. 4 and 5. This is very similar to the arrangement shown in FIGS. 2 and 3, except that the two strips 24 are now no longer made from a bi-metallic material, but are merely resilient strips. The strips are bent into the form shown so that a wedge-shaped spreader 27 may be inserted between the two arms. This spreader is biased into the upper position shown in FIG. 4 by suitable spring means (not shown), and is arranged so that it may be pulled downwards by the armature of an electromagnet 28.

As shown in FIG. 4, with the electromagnet de-energised, the spreader allows the resilient strips to move towards the datum pin 23 and so restrict the possible movement of the pin 26 and hence of float 10. When the electromagnet is energised, say when power is applied to the motor of the gyroscope, then the movement of the armature of the electromagnet pulls the spreader to the position shown in FIG. 5. As shown, this forces the two resilient arms apart, and allows the float to rotate through a large angle. Conveniently the electromagnet may be energised from the same supply as the gyro motor, thus giving fail-safe operation in the event of a power failure.

Other means of moving the arms 24 by an electromagnet may be used, or the electromagnet may be used to move into position some other form of limit means. Similarly, operating mechanisms other than electromagnets may be used, for example, lever-operated mechanical linkages.

What we claim is:

1. A floated gyroscope comprising a sealed float, a gyroscope motor and wheel located within said float, a housing in which said float is pivoted for limited rotational movement about an axis, a viscous fluid contained within said housing and surrounding said float, a locating member mounted on one of said housing and said float, and limit means carried by the other of said housing and said float and operable to restrict the angular movement of said locating member when the gyroscope is not in use to a value less than its normal operating value.

2. A gyroscope as claimed in claim 1 wherein said limit means are movable between a first position and a second position so as to vary the range of movement of said locating member.

3. A gyroscope as claimed in claim 2 wherein said limit means includes a pair of arms movable in response to changes in the temperature of said viscous fluid.

4. A gyroscope as claimed in claim 3 wherein said arms are bi-metallic strips.

5. A gyroscope as claimed in claim 4 wherein said pair of arms form a single bi-metallic strip.

6. A gyroscope as claimed in claim 2 including an electromagnet for controlling said limit means.

7. A gyroscope as claimed in claim 6 wherein said limit means are movable in response to the application and removal of electrical power to said gyroscope motor.

8. A gyroscope as claimed in claim 7 wherein said electromagnet is energized from the same source as said gyroscope motor.

9. A gyroscope as claimed in claim 1 wherein said locating member is mounted on said float and said limit means is carried by said housing.

10. A gyroscope as claimed in claim 1 wherein said locating member is a pin movable through the angle defined by said limit means.

* * * * *